(12) United States Patent
Serita et al.

(10) Patent No.: US 11,960,634 B2
(45) Date of Patent: Apr. 16, 2024

(54) TERMINAL EQUIPMENT, INFORMATION PROCESSING DEVICE, INFORMATION PROCESSING METHOD, AND PROGRAM

(71) Applicant: Japan Tobacco Inc., Tokyo (JP)

(72) Inventors: Kazutoshi Serita, Tokyo (JP); Masatoshi Senju, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 314 days.

(21) Appl. No.: 17/401,694

(22) Filed: Aug. 13, 2021

(65) Prior Publication Data

US 2021/0373653 A1 Dec. 2, 2021

Related U.S. Application Data

(63) Continuation of application No. PCT/JP2019/010319, filed on Mar. 13, 2019.

(51) Int. Cl.
| | |
|---|---|
| *G06F 3/01* | (2006.01) |
| *A24F 40/60* | (2020.01) |
| *A24F 40/65* | (2020.01) |
| *G06T 11/60* | (2006.01) |
| *G09B 19/24* | (2006.01) |

(52) U.S. Cl.
CPC .............. *G06F 3/011* (2013.01); *A24F 40/60* (2020.01); *A24F 40/65* (2020.01); *G06T 11/60* (2013.01); *G09B 19/24* (2013.01)

(58) Field of Classification Search
CPC .......... A24F 40/10; A24F 40/50; A24F 40/60; A24F 40/65; G06F 3/011; G06F 3/016
See application file for complete search history.

(56) References Cited

U.S. PATENT DOCUMENTS

| | | | |
|---|---|---|---|
| 2011/0106912 A1 | 5/2011 | Onda et al. | |
| 2018/0286208 A1* | 10/2018 | Baker | ............... H04W 4/023 |
| 2019/0000147 A1* | 1/2019 | Koc | .................. A24F 40/65 |
| 2019/0043260 A1* | 2/2019 | Anderson | .............. G06F 3/017 |

FOREIGN PATENT DOCUMENTS

| | | |
|---|---|---|
| JP | 2007-310529 A | 11/2007 |
| JP | 2007-310756 A | 11/2007 |
| JP | 2009-271750 A | 11/2009 |
| JP | 2014-199611 A | 10/2014 |

(Continued)

OTHER PUBLICATIONS

Extended European Search Report for European Application No. 19919127.1 dated Sep. 22, 2022.

(Continued)

*Primary Examiner* — Robin J Mishler
(74) *Attorney, Agent, or Firm* — Birch, Stewart, Kolasch & Birch, LLP

(57) ABSTRACT

To provide a mechanism that allows a user to have a novel inhalation experience, terminal equipment is provided that includes a communication unit that transmits inhalation information including information showing a location where a user is inhaling using an inhalation device and receives virtual space information that defines a virtual space created on the basis of the inhalation information; and a control unit that outputs from an output unit the virtual space defined by the virtual space information received.

15 Claims, 12 Drawing Sheets

(56) References Cited

FOREIGN PATENT DOCUMENTS

| | | |
|---|---|---|
| JP | 2014-199614 A | 10/2014 |
| WO | WO 2007/010411 A2 | 1/2007 |
| WO | WO 2017/121979 A1 | 7/2017 |

OTHER PUBLICATIONS

International Search Report, issued in PCT/JP2019/010319, PCT/ISA/210, dated Jun. 11, 2019.
Japanese Notice of Reasons for Refusal for Japanese Application No. 2022-082013, dated Jul. 31, 2023, with an English translation.

* cited by examiner

TERMINAL EQUIPMENT, INFORMATION PROCESSING DEVICE, INFORMATION PROCESSING METHOD, AND PROGRAM

CROSS REFERENCE TO RELATED APPLICATIONS

The present application is a continuation application of International Application No. PCT/JP2019/010319, filed on Mar. 13, 2019, which is hereby incorporated by reference into the present application.

TECHNICAL FIELD

The present invention relates to terminal device, an information processing device, an information processing method, and a program.

BACKGROUND ART

Inhalation devices such as electronic tobacco products and nebulizers that generate a gas with added flavor components to be inhaled by a user are becoming widespread. For example, a base material that contributes to the generation of a gas with added flavor components, such as an aerosol source for generating an aerosol and a flavor source for adding the flavor components, is loaded into an inhalation device. Thereafter, the contents accumulated in the base material are consumed every time a gas with added flavor components is generated. By inhaling (hereinafter also referred to as puffing) the gas with added flavor components generated by the inhalation device, the user is able to savor the gas together with the flavor.

To improve the quality of the inhalation experience using an inhalation device, technologies that provide the user with information associated with the use of the inhalation device are being investigated. For example, PTL 1 below discloses an augmented reality (AR) technology that superimposes a virtual object illustrating a combusted state and secondhand smoke onto a non-combustion inhalation device, thereby making the user feel as though he or she is actually inhaling a combusted tobacco product.

CITATION LIST

Patent Literature

PTL 1: International Publication No. WO 2007/010411

SUMMARY OF INVENTION

Technical Problem

However, the technology proposed in PTL 1 above merely causes the inhalation experience provided by an inhalation device to resemble the inhalation experience provided by pre-existing combusted tobacco products. In other words, the technology proposed in PTL 1 above merely provides an inhalation experience similar to the past, and can hardly be considered to provide a novel inhalation experience to the user.

Accordingly, the present invention has been devised in light of the above issues, and an object of the present invention is to propose a mechanism that allows the user to have a novel inhalation experience.

Solution to Problem

To address the above problem, according to one aspect of the present invention, there is provided terminal device including: a communication unit that transmits inhalation information including information indicating a location where a user inhales using an inhalation device, and receives virtual space information defining a virtual space generated on the basis of the inhalation information; and a control unit that causes the virtual space defined by the received virtual space information to be output by an output unit.

The virtual space information may also include regulatory information related to inhalation using the inhalation device.

The regulatory information may also be different depending on a type of the inhalation device.

The regulatory information may also be different depending on a type of a base material in which contents to be consumed by the inhalation device for generating a gas with added flavor components are accumulated.

The regulatory information may also include information indicating a location where inhalation using the inhalation device is not allowed.

In the virtual space, a virtual object indicating that inhalation is prohibited may also be placed at a location in the virtual space that corresponds to the location where inhalation using the inhalation device is not allowed.

In a case where a location where the user is inhaling using the inhalation device is a location where inhalation using the inhalation device is not allowed, the virtual space may also include information notifying the user that the user's points are subtracted.

The regulatory information may also include information indicating a location where inhalation using the inhalation device is allowed.

In a case where a location where the user is inhaling using the inhalation device is a location where inhalation using the inhalation device is allowed, the virtual space may also include information notifying the user that a benefit is granted to the user.

The virtual space may also be a space in which a space corresponding to the real world is updated according to the regulatory information.

An avatar corresponding to the user may also be placed in the virtual space, and an action executable by the avatar corresponding to the user may also be set according to a relationship between a location indicated by the inhalation information and the regulatory information.

An avatar corresponding to the user may also be placed in the virtual space, and the avatar corresponding to the user may also be displayed with an appearance according to a relationship between a location indicated by the inhalation information and the regulatory information.

In the virtual space, an avatar corresponding to each of the user and an another user may also be placed at a location in the virtual space that corresponds to a location indicated by the inhalation information obtained for each of the user and the another user.

In the virtual space, an avatar corresponding to each of the user and an another user may also be placed at a location in the virtual space that corresponds to a current location of each of the user and the another user.

The communication unit may also transmit information inputted by the user, and an avatar corresponding to each of the user and an another user may also be placed in the virtual space, and the avatar corresponding to the user and the avatar corresponding to the another user may also communicate in correspondence with the information inputted by the user.

The virtual space may also include information indicating a degree of congestion at each location where inhalation using the inhalation device is allowed.

Also, to address the above problem, according to another aspect of the present invention, there is provided an information processing device including: a communication unit that receives inhalation information indicating a location where a user inhales using an inhalation device; and a control unit that generates a virtual space corresponding to the received inhalation information, wherein the communication unit transmits virtual space information defining the generated virtual space to terminal device that outputs the virtual space to the user.

The virtual space information may also include regulatory information related to inhalation using the inhalation device.

The regulatory information may also be different depending on a type of the inhalation device.

The regulatory information may also be different depending on a type of a base material in which contents to be consumed by the inhalation device for generating a gas with added flavor components are accumulated.

The regulatory information may also include information indicating a location where inhalation using the inhalation device is not allowed.

In the virtual space, a virtual object indicating that inhalation is prohibited may also be placed at a location in the virtual space that corresponds to the location where inhalation using the inhalation device is not allowed.

In a case where a location where the user is inhaling using the inhalation device is a location where inhalation using the inhalation device is not allowed, the virtual space may also include information notifying the user that the user's points are subtracted.

The regulatory information may also include information indicating a location where inhalation using the inhalation device is allowed.

In a case where a location where the user is inhaling using the inhalation device is a location where inhalation using the inhalation device is allowed, the virtual space may also include information notifying the user that a benefit is granted to the user.

The virtual space may also be a space in which a space corresponding to the real world is updated according to the regulatory information.

An avatar corresponding to the user may also be placed in the virtual space, and an action executable by the avatar corresponding to the user may also be set according to a relationship between a location indicated by the inhalation information and the regulatory information.

An avatar corresponding to the user may also be placed in the virtual space, and the avatar corresponding to the user may also be displayed with an appearance according to a relationship between a location indicated by the inhalation information and the regulatory information.

The control unit may also update the regulatory information on the basis of a history of the inhalation information for each user.

In the virtual space, an avatar corresponding to each of the user and an another user may also be placed at a location in the virtual space that corresponds to a location indicated by the inhalation information obtained for each of the user and the another user.

In the virtual space, an avatar corresponding to each of the user and an another user may also be placed at a location in the virtual space that corresponds to a current location of each of the user and the another user.

The communication unit may also receive information inputted by the user, and an avatar corresponding to each of the user and an another user may also be placed in the virtual space, and the avatar corresponding to the user and the avatars corresponding to the another user may also communicate in correspondence with the information inputted by the user.

The control unit may also generate information indicating a degree of congestion for each location where inhalation using the inhalation device is allowed, on the basis of the inhalation information, and the virtual space may also include information indicating the degree of congestion.

Also, to address the above problem, according to another aspect of the present invention, there is provided an information processing method including: transmitting inhalation information including information indicating a location where a user inhales using an inhalation device, and receiving virtual space information defining a virtual space generated on the basis of the inhalation information; and causing the virtual space defined by the received virtual space information to be output by an output unit.

Also, to address the above problem, according to another aspect of the present invention, there is provided an information processing method including: receiving inhalation information indicating a location where a user inhales using an inhalation device; generating a virtual space corresponding to the received inhalation information; and transmitting virtual space information defining the generated virtual space to terminal device that outputs the virtual space to the user.

Also, to address the above problem, according to another aspect of the present invention, there is provided a program causing a computer to execute a process comprising: transmitting inhalation information including information indicating a location where a user inhales using an inhalation device, and receiving virtual space information defining a virtual space generated on the basis of the inhalation information; and causing the virtual space defined by the received virtual space information to be output by an output unit.

Also, to address the above problem, according to another aspect of the present invention, there is provided a program causing a computer to execute a process comprising: receiving inhalation information indicating a location where a user inhales using an inhalation device; generating a virtual space corresponding to the received inhalation information; and transmitting virtual space information defining the generated virtual space to terminal device that outputs the virtual space to the user.

Advantageous Effects of Invention

According to the present invention as described above, a mechanism that allows the user to have a novel inhalation experience is provided.

DESCRIPTION OF EMBODIMENTS

Hereinafter, a preferred embodiment of the present invention will be described in detail and with reference to the accompanying drawings. Note that, in this specification and the drawings, structural elements that have substantially the same function and structure are denoted with the same reference signs, and duplicate description of these structural elements is omitted.

«1. Overview of Proposed Technology»

Figure 1:
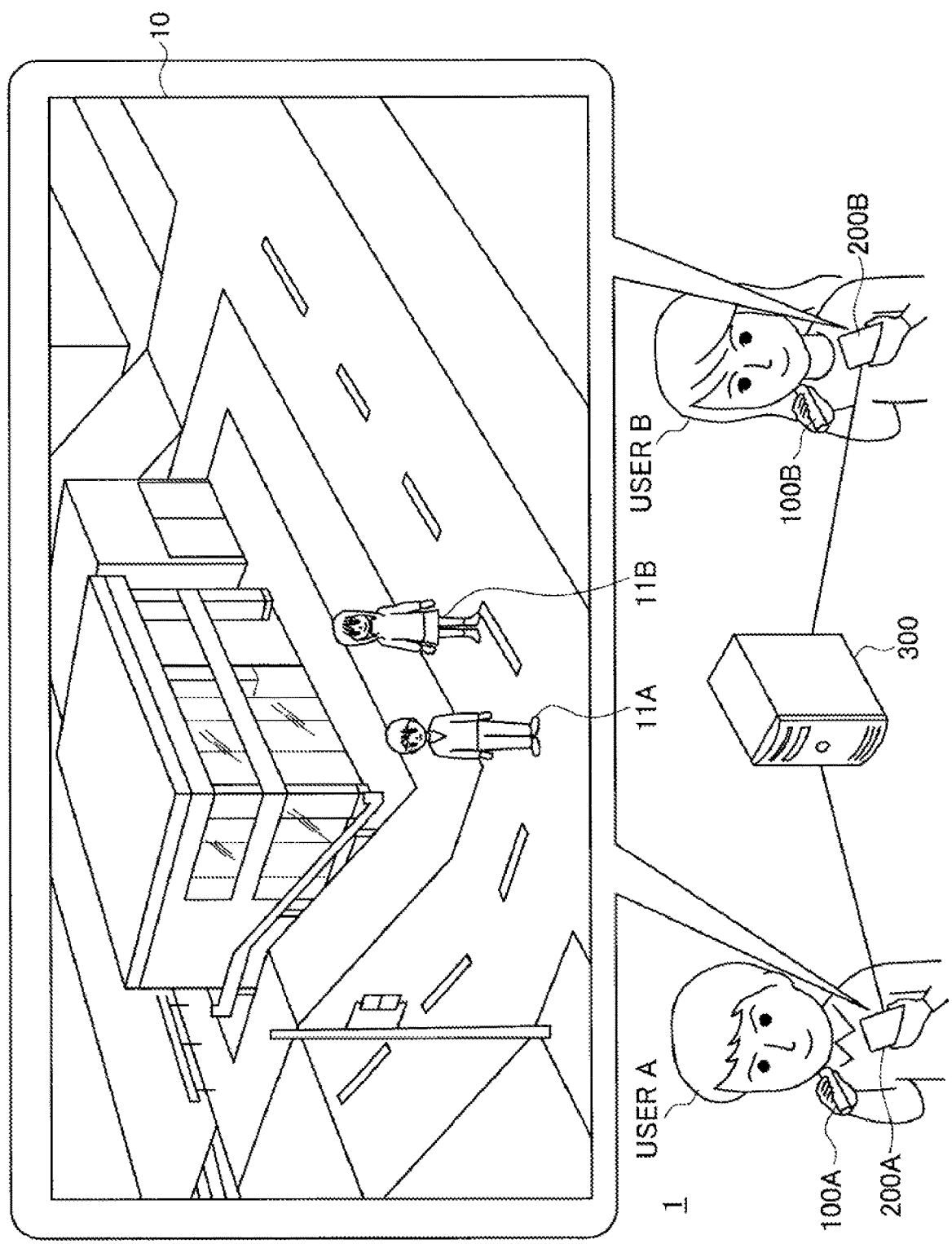
FIG. 1 is a diagram illustrating an example of a configuration of a system according to an embodiment of the present invention.

FIG. 1 is a diagram illustrating an example of a configuration of a system 1 according to an embodiment of the present invention. As illustrated in FIG. 1, the system 1 includes a plurality of inhalation devices 100 (100A and 100B), a plurality of terminal device 200 (200A and 200B), and a management device 300.

Each inhalation device 100 is a device that generate a gas with added flavor components to be inhaled by a user. For example, each inhalation device 100 is configured to generate an aerosol containing flavor components by heating a base material in which contents such as an aerosol source and a flavor source are accumulated.

Each terminal device 200 is an information processing device operated by a user. The terminal device 200 transmits and receives information to and from the inhalation devices 100 and the management device 300, and outputs information based on the communication to the user. The terminal device 200 has at least a display device such as a display or projector capable of outputting images. The terminal device 200 is a device such as a smartphone, a tablet terminal, or a wearable device.

The management device 300 is an information processing device that manages the various devices included in the system 1. The management device 300 transmits and receives information to and from the terminal device 200. For example, the management device 300 generates a virtual space 10 on the basis of information received from the terminal device 200, and causes the terminal device 200 to output the generated virtual space 10.

The virtual space 10 includes an avatar corresponding to the user of each of the plurality of inhalation devices 100 included in the system 1. For example, an avatar 11A corresponds to a user A, and an avatar 11B corresponds to a user B. By operating his or her avatar through the terminal device 200, each user is able to cause the avatar to behave in a desired way in the virtual space. The virtual space 10 may be associated with a real space, and the avatars 11 may be placed at locations inside the virtual space 10 according to the locations of the users in the real space. The users are able to communicate with other users through their avatars in the virtual space 10.

As an example, the virtual space 10 may be the game space of an online game. Not all of the users of the inhalation devices 100 have to participate in the game, and a portion of the users of the inhalation devices 100 may participate in the game. Here, the virtual space 10 is generated according to inhalations performed by users using the inhalation devices 100. For example, interaction occurs in the virtual space 10 according to the locations where users inhale using the inhalation devices 100. In other words, by inhaling using the inhalation devices 100, the users are able to not only savor the flavor, but also enjoy a game experience in the virtual space. In this way, according to the proposed technology, it is possible to provide a completely novel inhalation experience to users.

«2. Exemplary Configuration of Each Device»

<2.1. Exemplary Configuration of Inhalation Device>

(1) Exemplary Internal Configuration

Figure 2:
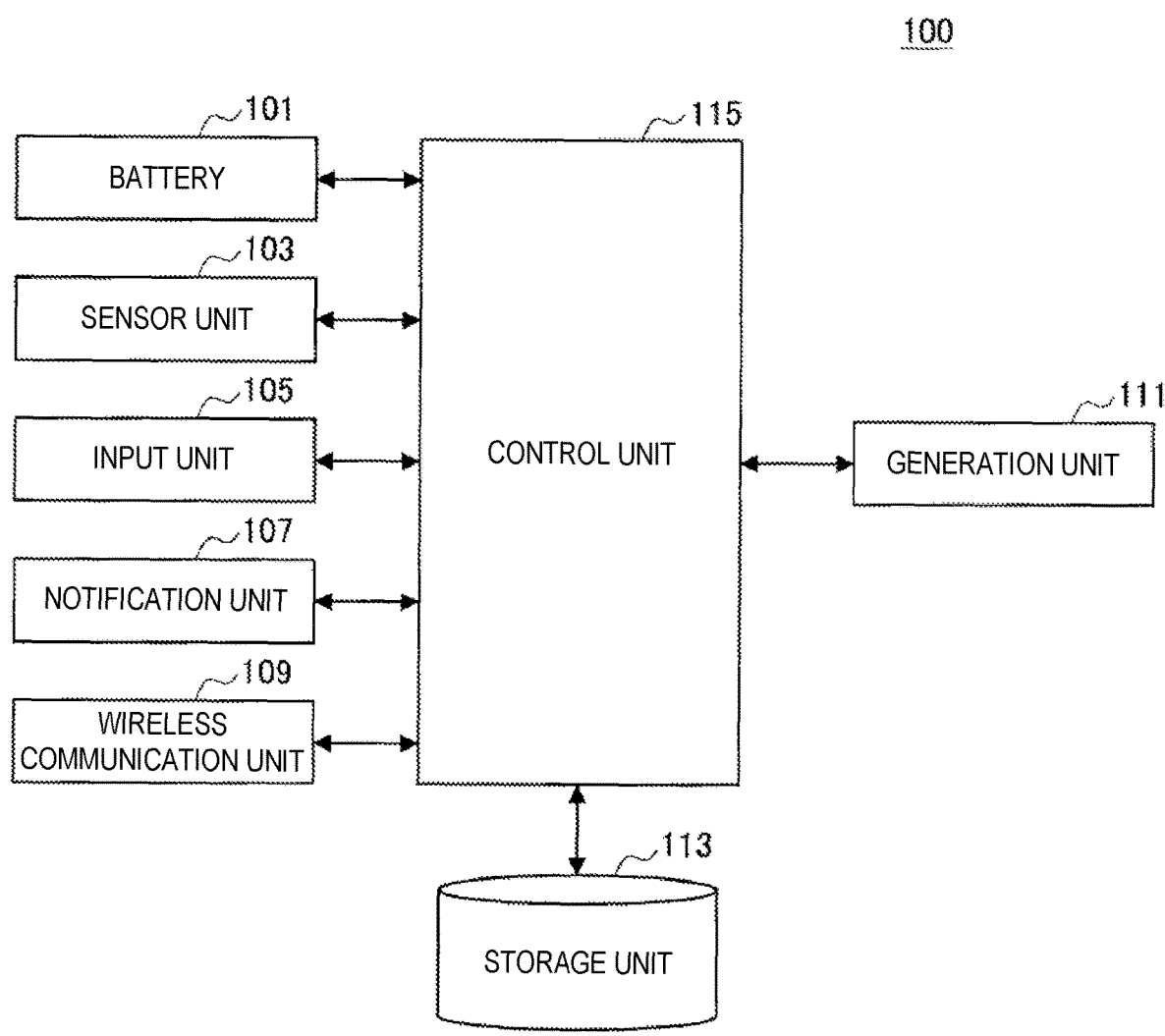
FIG. 2 is a block diagram illustrating an example of an internal configuration of an inhalation device according to the embodiment.

FIG. 2 is a block diagram illustrating an example of an internal configuration of one of the inhalation devices 100 according to the embodiment. As illustrated in FIG. 2, the inhalation device 100 according to the embodiment includes a battery 101, a sensor unit 103, an input unit 105, a notification unit 107, a wireless communication unit 109, a generation unit 111, a storage unit 113, and a control unit 115.

(Generation Unit 111)

The generation unit 111 has a function of generating a gas with added flavor components. Contents to be consumed by the generation unit 111 to generate the gas with added flavor components are accumulated in a base material.

Here, the contents refer to substances such as an aerosol source for generating an aerosol and a flavor source for adding flavor components to the aerosol, for example. The aerosol source may be a solid or a liquid. For example, the aerosol source may be a polyhydric alcohol such as glycerin or propylene glycol, or a liquid such as water. The flavor source may contain raw tobacco or extracts derived from raw tobacco that release fragrant components when heated. In the case where the inhalation device 100 is a medical inhaler such as a nebulizer, the flavor source may also contain a medicine to be inhaled by a patient. Depending on the use, the base material does not have to contain a flavor source. Also, the gas with added flavor components is not limited to an aerosol, and may also be an invisible vapor, for example.

As an example, first, the generation unit 111 may generate an aerosol by atomizing the aerosol source, and then cause flavor components to be added to the aerosol as the aerosol passes through the flavor source provided in the flow channel of the aerosol, and thereby generate an aerosol with added flavor components. Note that a means of any type, such as heating or ultrasonic vibration, may be used for the atomization. As another example, the generation unit 111 may heat the aerosol source and the flavor source to generate an aerosol with added flavor components.

The inhalation device 100 includes an air intake flow channel that takes air into the inhalation device 100, and an aerosol flow channel that exhausts the aerosol generated by the generation unit 111 outside the inhalation device 100. The aerosol generated by the generation unit 111 is mixed with air taken in through the air intake flow channel. Thereafter, a mixed fluid of aerosol and air is sent to the aerosol flow channel, exhausted outside the inhalation device 100, and enters the user's mouth.

The generation unit 111 may also start the generation of the gas with added flavor components in the case where the sensor unit 103 described later detects an inhalation by the user, or in the case where the input unit 105 described later detects predetermined user input.

(Battery 101)

The battery 101 is a power source that accumulates and supplies electric power to each component inside the inhalation device 100. The battery 101 may be a rechargeable or a non-rechargeable battery, for example. The battery 101 may also be configured to be recharged by being connected to an external power supply through a predetermined port of the inhalation device 100. The battery 101 alone may also be removable from the inhalation device 100, and may be replaced with a fresh battery 101.

(Sensor Unit 103)

The sensor unit 103 has a function of detecting various information related to the inhalation device 100. The sensor unit 103 may include a pressure sensor that detects pressure variations or a flow sensor that detects the flow inside the air intake flow channel and/or the aerosol flow channel. The sensor unit 103 may also include a weight sensor that detects the quantity or weight of the contents accumulated in the base material. The sensor unit 103 may also be configured to count the number of times the user inhales using the inhalation device 100. The sensor unit 103 may also be configured to acquire the times at which the user inhales using the inhalation device 100. The sensor unit 103 may also be configured to identify the base material loaded into the inhalation device 100 when inhaling using the inhalation device 100. The sensor unit 103 may also be configured to add up the power-on time of the generation unit 111. The sensor unit 103 may also be configured to detect properties of the battery 101, such as the state of charge (SOC), the total current value, and the voltage. The total current value may be obtained by a method such as current integration or from a state of charge versus open circuit voltage (SOC-OCV) relationship.

(Input Unit 105)

The input unit 105 has a function of receiving the input of various information from the user. For example, the input unit 105 may include devices such as a keyboard, one or more buttons and switches, or a microphone.

(Notification Unit 107)

The notification unit 107 has a function of notifying the user of information. The notification unit 107 may include a light emitter such as a light-emitting diode (LED), a display, a speaker, and a vibrator, for example. The notification unit 107 is configured to notify the user in some way by producing at least one of light, a visual display, sound, and vibration as appropriate. In addition, the notification unit 107 may also transmit information to another device through the wireless communication unit 109 described later, and notify the user of the information through the other device.

(Wireless Communication Unit 109)

The wireless communication unit 109 is a wireless interface that has a function as a transmitting unit and a receiving unit for transmitting and receiving information between the inhalation device 100 and other devices. For example, the wireless communication unit 109 performs wireless communication conforming to any of various wireless communication standards, such as Local Area Network (LAN), Wi-Fi®, Bluetooth®, Low Power Wide Area (LPWA), or Near Field Communication (NFC). For example, the wireless communication unit 109 transmits and receives various information related to the inhalation device 100 to and from the terminal device 200.

(Storage Unit 113)

The storage unit 113 has a function of temporarily or persistently storing information for the operation of the inhalation device 100. For example, the storage unit 113 is configured by a non-volatile storage medium such as flash memory.

(Control Unit 115)

The control unit 115 functions as a computational processing device and control device, and controls overall operation inside the inhalation device 100 by following various programs. The control unit 115 is achieved by an electronic circuit such as a central processing unit (CPU) or a microprocessor, for example. Note that the control unit 115 may also include read-only memory (ROM) that stores information such as programs to use and computational parameters, as well as random access memory (RAM) that temporarily stores information such as parameters that change as appropriate. The inhalation device 100 executes various processes on the basis of control by the control unit 115. Examples of such processes controlled by the control unit 115 include the supplying/charging of the battery 101 with electric power, the detection of information by the sensor unit 103, the inputting of information by the input unit 105, the notification of information by the notification unit 107, the transmission and reception of information by the wireless communication unit 109, the generation of a gas with added flavor components by the generation unit 111, and the storing and loading of information by the storage unit 113. Other processes executed by the inhalation device 100, such as the inputting of information into each component and processes based on information outputted from each component, are also controlled by the control unit 115.

(2) Exemplary External Configuration

First Exemplary External Configuration

Figure 3:
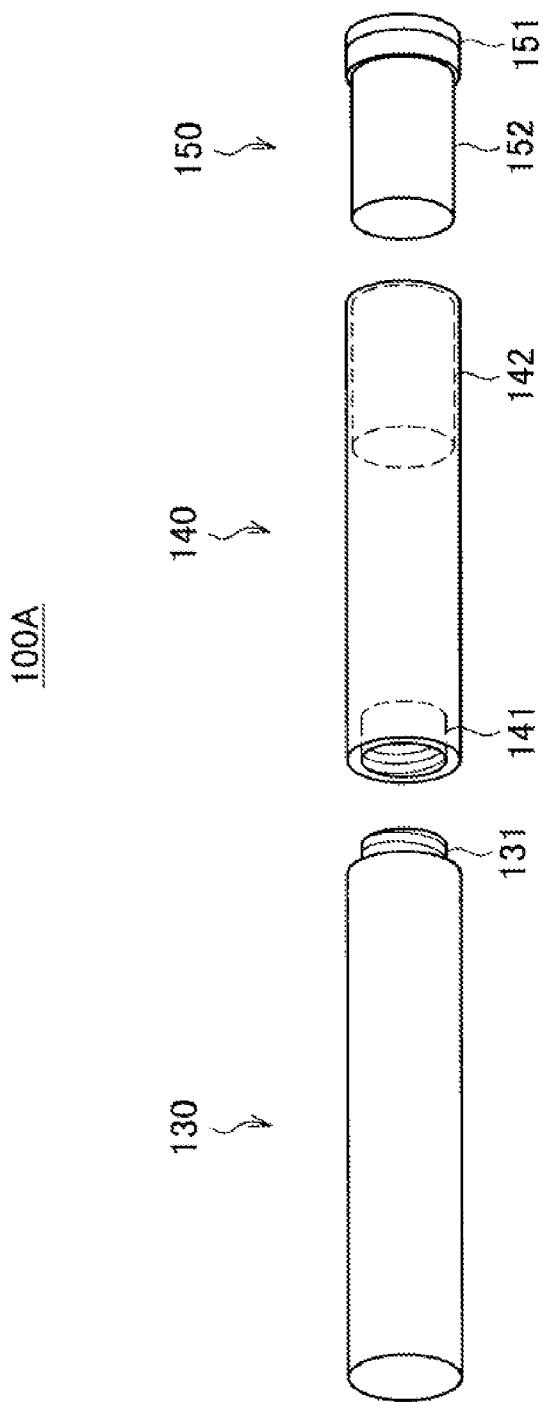
FIG. 3 is a diagram illustrating an example of an external configuration of the inhalation device according to the embodiment.

FIG. 3 is a diagram illustrating an example of an external configuration of the inhalation device 100A according to the embodiment. The inhalation device 100A illustrated in FIG. 3 includes a first member 130, a second member 140, and a third member 150. In the following, the first member 130 is also referred to as the main body unit 130, the second member 140 is also referred to as the cartridge 140, and the third member 150 is also referred to as the capsule 150.

The battery 101, the sensor unit 103, the input unit 105, the notification unit 107, the wireless communication unit 109, the storage unit 113, and the control unit 115 described with reference to FIG. 2 are placed in the main body unit 130, for example. The generation unit 111 and the aerosol source described with reference to FIG. 2 are placed in the cartridge 140, for example. The flavor source is placed in the capsule 150, for example. Note that this arrangement is merely an example, and any of various other arrangements are applicable.

As illustrated in FIG. 3, the main body unit 130, the cartridge 140, and the capsule 150 are each configured to have a cylindrical shape. Additionally, inhalation is performed in a state in which these members are attached to each other.

The main body unit 130 has a male connector 131 on one end. The male connector 131 has a spiral projection running along the circumferential direction. Also, the cartridge 140 has a female connector 141 on one end. The female connector 141 has a spiral groove running along the circumferential direction. By causing the male connector 131 to engage with the female connector 141, the main body unit 130 and the cartridge 140 are connected. In other words, the cartridge 140 is removably attached to the main body unit 130.

The cartridge 140 has a housing part 142 forming a cylindrical space on the opposite end from the end where the female connector 141 is provided. The capsule 150 includes an inhaler part 151 having the same or nearly the same diameter as the main body unit 130 and the cartridge 140, and an insertion part 152 having a smaller diameter than the inhaler part 151. The insertion part 152 is inserted into and made to engage with the housing part 142. In other words, the capsule 150 is removably attached to the cartridge 140. The user attaches the cartridge 140 to the main body unit 130 and attaches the capsule 150 to the cartridge 140, and by putting the inhaler part 151 in his or her mouth and inhaling in this state, the user is able to draw in air containing the aerosol with added flavor into the oral cavity.

Second Exemplary External Configuration

Figure 4:
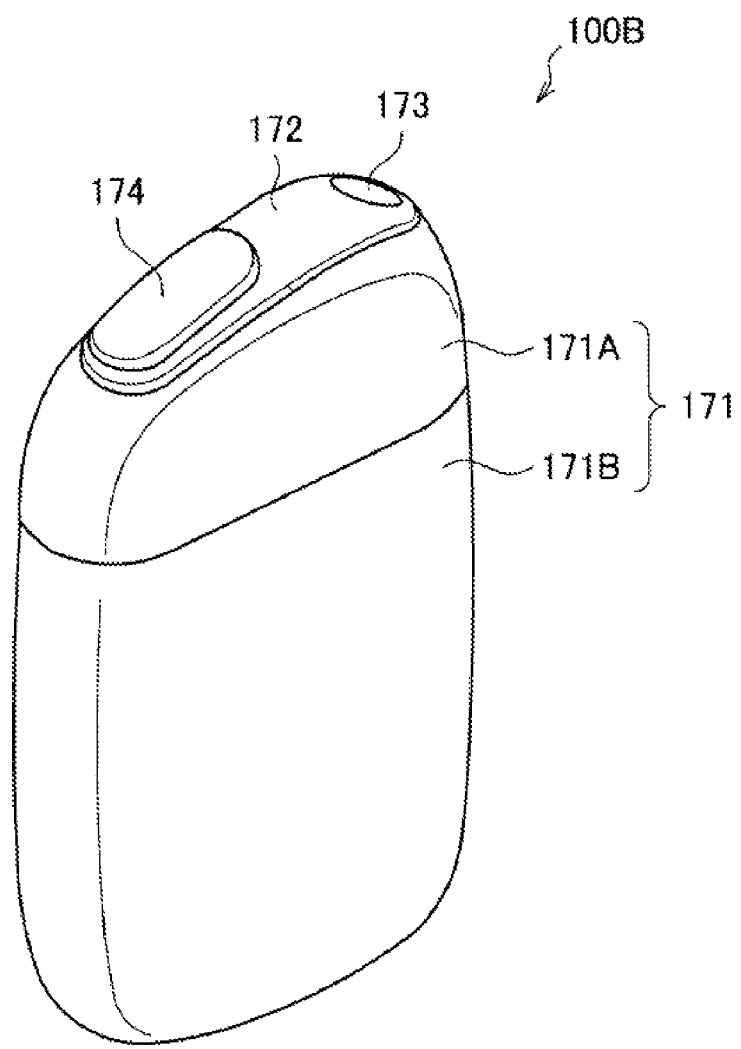
FIG. 4 is a diagram illustrating an example of an external configuration of the inhalation device according to the embodiment.
Figure 5:
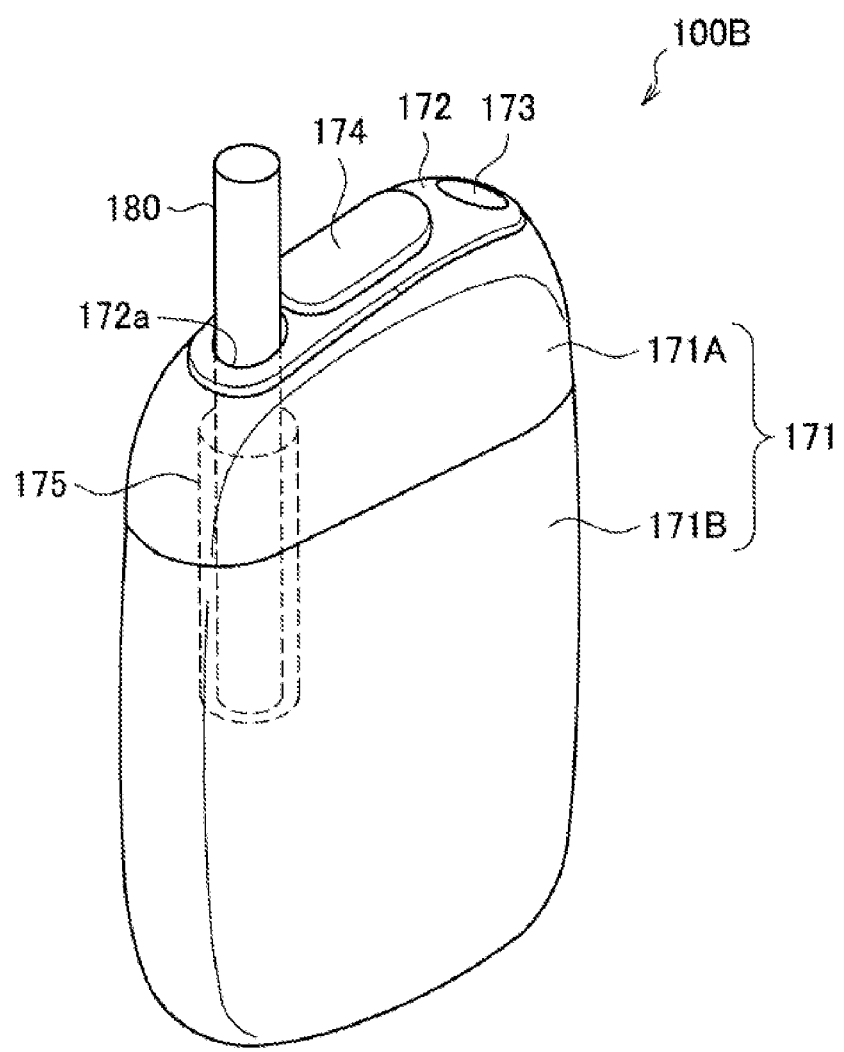
FIG. 5 is a diagram illustrating an example of an external configuration of the inhalation device holding a base material according to the embodiment.

FIG. 4 is a diagram illustrating an example of an external configuration of the inhalation device 100B according to the embodiment. The battery 101, the sensor unit 103, the input unit 105, the notification unit 107, the wireless communication unit 109, the generation unit 111, the storage unit 113, and the control unit 115 described with reference to FIG. 2 are placed in the inhalation device 100B illustrated in FIG. 4. Also, in this exemplary configuration, the base material is configured separately and independently from the inhalation device 100B. FIG. 5 is a diagram illustrating an example of an external configuration of the inhalation device 100B holding a base material 180 according to the embodiment.

As illustrated in FIGS. 4 and 5, the inhalation device 100B has a top housing 171A, a bottom housing 171B, a cover 172, a switch 173, and a lid 174. Also, as illustrated in FIG. 5, the inhalation device 100B has a heating unit 175 internally. Note that the switch 173 corresponds to the input unit 105 described with reference to FIG. 2. Also, the heating unit 175 corresponds to the generation unit 111 described with reference to FIG. 2. The top housing 171A and the bottom housing 171B interconnect to configure an outermost housing 171 of the inhalation device 100B. The housing 171 may also be sized to fit in a user's hand. In this case, when a user uses the inhalation device 100B, the user is able to hold the inhalation device 100B in his or her hand to inhale the aerosol.

The top housing 171A has an opening (not illustrated), and the cover 172 is coupled to the top housing 171A so as to close the opening. As illustrated in FIG. 5, the cover 172 has an opening 172a into which the base material 180 can be inserted. The lid 174 is configured to open and close the opening 172a of the cover 172. Specifically, the lid 174 is attached to the cover 172, and is configured to move along the surface of the cover 172 between a first position that closes the opening 172a and a second position that exposes the opening 172a.

The switch 173 is used to switch the operation of the inhalation device 100B on and off. For example, by having the user insert the base material 180 into the opening 172a as illustrated in FIG. 5 and operate the switch 173 while in this state, electric power is supplied to the heating unit 175 from the battery 101 (not illustrated), and the base material 180 can be heated without being burned.

The heating unit 175 has a heating assembly that extends in the direction in which the base material 180 is inserted into the opening 172a. The heating assembly is configured by a plurality of tubular members that form a tubular shape as a whole. The heating assembly is configured to house a portion of the base material 180 internally and has a function of demarcating the flow channel of air to supply to the base material 180 as well as a function of heating the base material 180 from the outer circumference thereof. When the base material 180 is heated, an aerosol is produced from the aerosol source contained in the base material 180, and flavor components from the flavor source are incorporated into the aerosol. By inhaling on the portion of the base material 180 that projects out from the inhalation device 100B (the portion illustrated using solid lines in FIG. 5), the user is able to inhale the aerosol containing the flavor components.

<2.2. Exemplary Configuration of Terminal Device>

Figure 6:
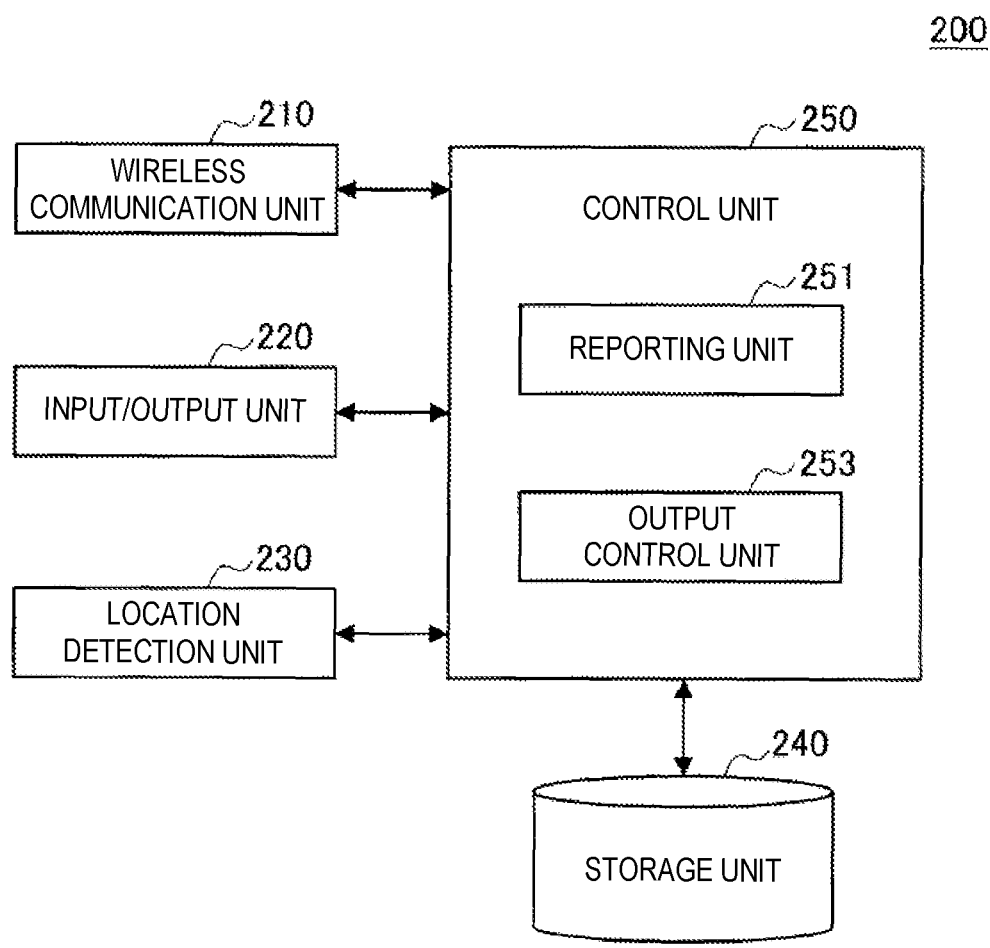
FIG. 6 is a block diagram illustrating an exemplary configuration of terminal device according to the embodiment.

FIG. 6 is a block diagram illustrating an exemplary configuration of the terminal device 200 according to the embodiment. As illustrated in FIG. 6, the terminal device 200 has a wireless communication unit 210, an input/output unit 220, a location detection unit 230, a storage unit 240, and a control unit 250.

Wireless Communication Unit 210

The wireless communication unit 210 is a wireless interface that has a function as a transmitting unit and a receiving unit for transmitting and receiving information between the terminal device 200 and other devices. For example, the wireless communication unit 210 performs wireless communication conforming to any of various wireless communication standards, such as cellular communication, Local Area Network (LAN), Wi-Fi®, Bluetooth®, Low Power Wide Area (LPWA), or Near Field Communication (NFC). For example, the wireless communication unit 210 communicates with the inhalation device 100 and the management device 300.

Input/Output Unit 220

The input/output unit 220 includes an input unit that receives the input of information from the user and an output unit that outputs information to the user. For example, the input unit may be configured by one or more buttons, a keyboard, a touch panel, or a microphone and the like. The output unit may be configured by an image output device such as a display, a sound output device such as a speaker, and a vibration device such as an eccentric motor, for example.

Location Detection Unit 230

The location detection unit 230 has a function of detecting location information that indicates the location of the terminal device 200. For example, the location detection unit 230 detects location information including a latitude, a longitude, and an altitude of the device by receiving Global Navigation Satellite System (GNSS) signals from GNSS satellites (such as Global Positioning System (GPS) signals from GPS satellites), and outputs the detected location information. Note that the location detection unit 230 may also detect location information using any other technology. For example, the location detection unit 230 may also detect location information through Wi-Fi®, by transmission and reception with a device such as a mobile phone, PHS, or smartphone, or through short-range wireless communication.

Storage Unit 240

The storage unit 240 has a function of storing various information for the operation of the terminal device 200. For example, the storage unit 240 is configured by a non-volatile storage medium such as flash memory.

Control Unit 250

The control unit 250 functions as a computational processing device and control device, and controls overall operation inside the terminal device 200 by following various programs. The control unit 250 is achieved by an electronic circuit such as a CPU or a microprocessor, for example. Note that the control unit 250 may also include ROM that stores information such as programs to use and computational parameters, as well as RAM that temporarily stores information such as parameters that change as appropriate. The terminal device 200 executes various processes on the basis of control by the control unit 250. For example, the transmission and reception of information by the wireless communication unit 210, the inputting and outputting of information by the input/output unit 220, the location detection by the location detection unit 230, and the storing and loading of information by the storage unit 240 are examples of processes controlled by the control unit 250. Other processes executed by the terminal device 200, such as the inputting of information into each component and processes based on information outputted from each component, are also controlled by the control unit 250.

As illustrated in FIG. 6, the control unit 250 functions as a reporting unit 251 and an output control unit 253. The reporting unit 251 has a function of reporting various information collected from the inhalation device 100 to the management device 300. The output control unit 253 has a function of controlling output based on information received from the management device 300. These components will be described in further detail later.

<2.3. Exemplary Configuration of Management Device>

Figure 7:
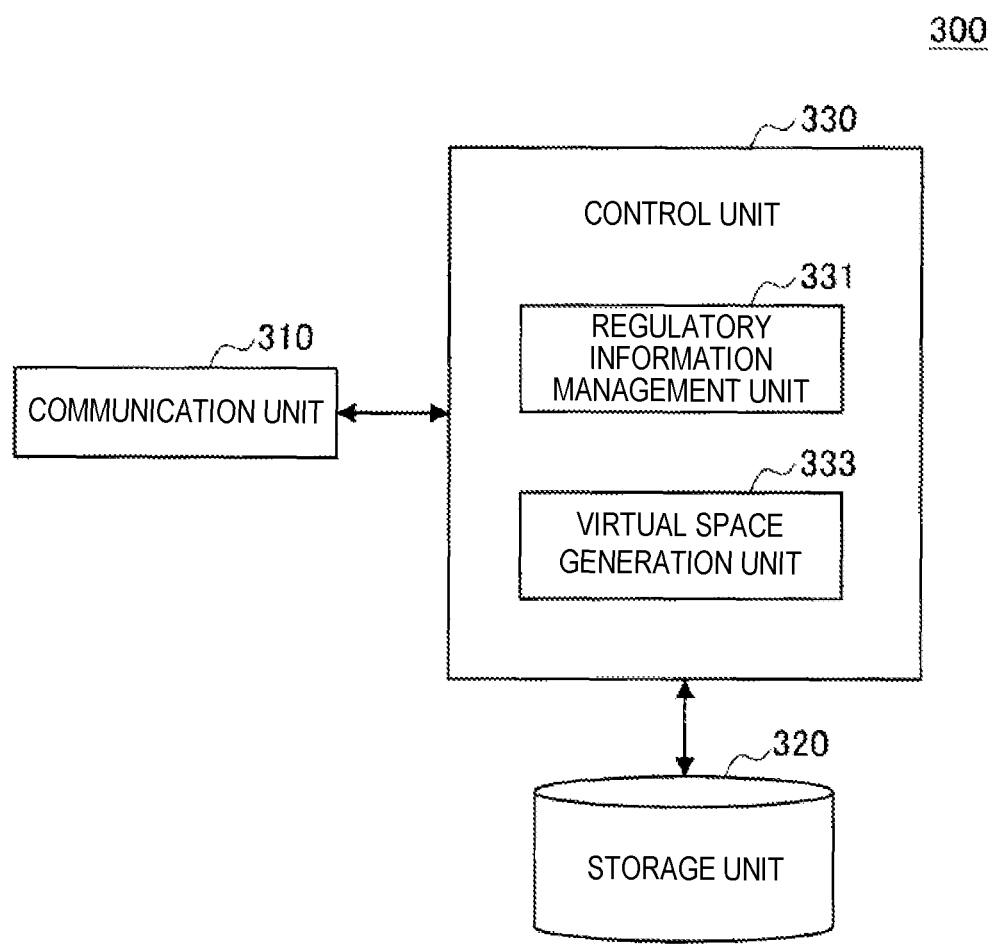
FIG. 7 is a block diagram illustrating an exemplary configuration of a management device according to the embodiment.

FIG. 7 is a block diagram illustrating an exemplary configuration of the management device 300 according to the embodiment. As illustrated in FIG. 7, the management device 300 has a communication unit 310, a storage unit 320, and a control unit 330.

Communication Unit 310

The communication unit 310 is a wireless or wired interface that functions as a transmitting unit and a receiving unit for transmitting and receiving information between the management device 300 and other devices. The communication unit 310 typically transmits and receives information via LAN or a telephone line. For example, the communication unit 310 communicates with the terminal device 200.

Storage Unit 320

The storage unit 320 has a function of storing various information for the operation of the management device 300. For example, the storage unit 320 is configured by a non-volatile storage medium such as a hard disk drive (HDD) or flash memory.

Control Unit 330

The control unit 330 functions as a computational processing device and control device, and controls overall operation inside the management device 300 by following various programs. The control unit 330 is achieved by an electronic circuit such as a CPU or a microprocessor, for example. Note that the control unit 330 may also include ROM that stores information such as programs to use and computational parameters, as well as RAM that temporarily stores information such as parameters that change as appropriate. The management device 300 executes various processes on the basis of control by the control unit 330. For example, the transmission and reception of information by the communication unit 310 and the storing and loading of information by the storage unit 320 are examples of processes controlled by the control unit 330. Other processes executed by the management device 300, such as the inputting of information into each component and processes based on information outputted from each component, are also controlled by the control unit 330.

As illustrated in FIG. 7, the control unit 330 functions as a regulatory information management unit 331 and a virtual space generation unit 333. The regulatory information management unit 331 has a function of collecting and managing regulatory information related to inhalation using the inhalation device 100. The virtual space generation unit 333 has a function of generating a virtual space. These components will be described in further detail later.

«3. Technical Features»

(1) Generation of Virtual Space Based on Inhalation Information

When inhalation by the user is detected, the inhalation device 100 transmits information indicating the detection result to the terminal device 200. Additionally, the inhalation device 100 may also transmit at least one of identification information of the inhalation device 100, identification information of the base material loaded into the inhalation device 100, the number of inhalations, and the times when the inhalations were performed to the terminal device 200.

The terminal device 200 (for example, the reporting unit 251) generates inhalation information related to inhalations performed by the user using the inhalation device 100. The inhalation information includes location information indicating the locations where the user inhaled using the inhalation device 100 (hereinafter referred to as the inhalation locations). For example, when information indicating the detection of an inhalation by the user is received from the terminal device 200, the terminal device 200 acquires location information about the current location and generates inhalation information including the acquired location information. Additionally, the inhalation information may also include at least one of identification information of the terminal device 200, identification information of the user, identification information of the inhalation device 100, identification information of the base material loaded into the inhalation device 100, the number of inhalations, and the times when the inhalations were performed. The terminal device 200 transmits the generated inhalation information to the management device 300.

The management device 300 (for example, the virtual space generation unit 333) generates a virtual space on the basis of inhalation information received from the terminal device 200. The virtual space is a space being configured by a plurality of virtual objects. Virtual objects such as a ground surface, roads, buildings, and avatars are placed in the virtual space. The management device 300 places an avatar corresponding to the user of the terminal device 200 in the virtual space on the basis of inhalation information received from the terminal device 200. Note that virtual space generation is a concept that also includes updating the virtual space, such as changing the location of the avatar. For example, first, the management device 300 generates a virtual space corresponding to a real space by placing virtual objects corresponding to real objects, such as the ground surface, roads, and buildings in the real space. Thereafter, the management device 300 places an avatar corresponding to the user at a location in the virtual space that corresponds to the inhalation location of the user in the real space, as indicated by the inhalation information. The management device 300 similarly places avatars for other users as well. More specifically, the management device 300 places avatars corresponding to other users at locations in the virtual space that correspond to the inhalation locations of the users in the real space, as indicated by the inhalation information obtained for each of the other users. Note that the virtual space does not have to correspond to the real space exactly, and it is sufficient if at least the directions in the real space are aligned with the directions in the virtual space.

The management device 300 (for example, the virtual space generation unit 333) transmits virtual space information defining the generated virtual space to the terminal device 200. The virtual space information includes identification information, location information, attitude information, texture information, and other information related to a virtual object for each virtual object included in the virtual space. With regard to avatars, the virtual space information also includes information indicating friendship relationships between avatars (that is, relationships between users in the virtual space) and information related to communication between avatars. Note that generating the virtual space is synonymous with generating virtual space information. Also, information included in the virtual space is also included similarly in the virtual space information.

The terminal device 200 (for example, the output control unit 253) receives virtual space information from the management device 300, and outputs a virtual space defined by the received virtual space information. For example, the terminal device 200 displays an image illustrating the virtual space that includes the avatar of the user. In addition, the terminal device 200 may also output sound, vibration, and the like on the basis of the virtual space information.

(2) Characteristics of Virtual Space

Hereinafter, the characteristics of the virtual space will be described with reference to FIGS. 8 to 11. FIGS. 8 to 11 are diagrams illustrating examples of a virtual space displayed by the terminal device 200 according to the embodiment.

The virtual space (in other words, the virtual space information) may include regulatory information related to inhalation using the inhalation device 100. Regulatory information is information indicating the content of regulations related to inhalation using the inhalation device 100 as well as conditions such as locations and time periods to which the regulations are applied. Such regulations are defined by an entity such as a national or municipal government. By having the virtual space including regulatory information, the user is able to recognize the regulatory information while enjoying a game.

The regulatory information may be different depending on the type of inhalation device 100. With regard to tobacco, inhalation devices 100 are classified into heated tobacco products and electronic tobacco products. Heated tobacco products use tobacco leaf to produce a vapor containing tobacco flavor components, without burning the tobacco leaf. Heated tobacco products may be classified further into a type that heats tobacco leaf at low temperatures and a type that heats tobacco leaf at high temperatures. The type that heats tobacco leaf at low temperatures adopts a method of producing a vapor containing tobacco flavor components by heating and atomizing a liquid, and then causing the liquid to pass through the tobacco leaf, without heating the tobacco leaf directly, for example. A configuration of a heated tobacco product according to this method is described above with reference to FIG. 3. A heated tobacco product according to this method may also be referred to as infused vapor. The type that heats tobacco leaf at high temperatures adopts a method of producing a vapor containing tobacco flavor components by heating tobacco leaf directly, for example. A configuration of a heated tobacco product according to this method is described above with reference to FIGS. 4 and 5. A heated tobacco product according to this method may also be referred to as T-vapor. On the other hand, electronic tobacco products produce a vapor containing tobacco flavor components without using tobacco leaf. For example, electronic tobacco products produce a vapor containing tobacco flavor components by heating and atomizing a liquid containing tobacco flavor components. Electronic tobacco products may also be referred to as E-vapor. For example, the management device 300 generates a virtual space including regulatory information according to the identification information of the inhalation device 100 included in the inhalation information. With this configuration, the user is able to easily recognize the regulatory information according to the inhalation device 100 that the user uses to inhale.

The regulatory information may be different depending on the type of base material. Types of base materials may be classified according to properties such as the type of flavor, the type of aerosol source, and the nicotine content, for example. The management device 300 generates a virtual space including regulatory information according to the identification information of the base material loaded into the inhalation device 100 included in the inhalation information, for example. With this configuration, the user is able to easily recognize the regulatory information according to the base material that the user uses to inhale.

Figure 8:
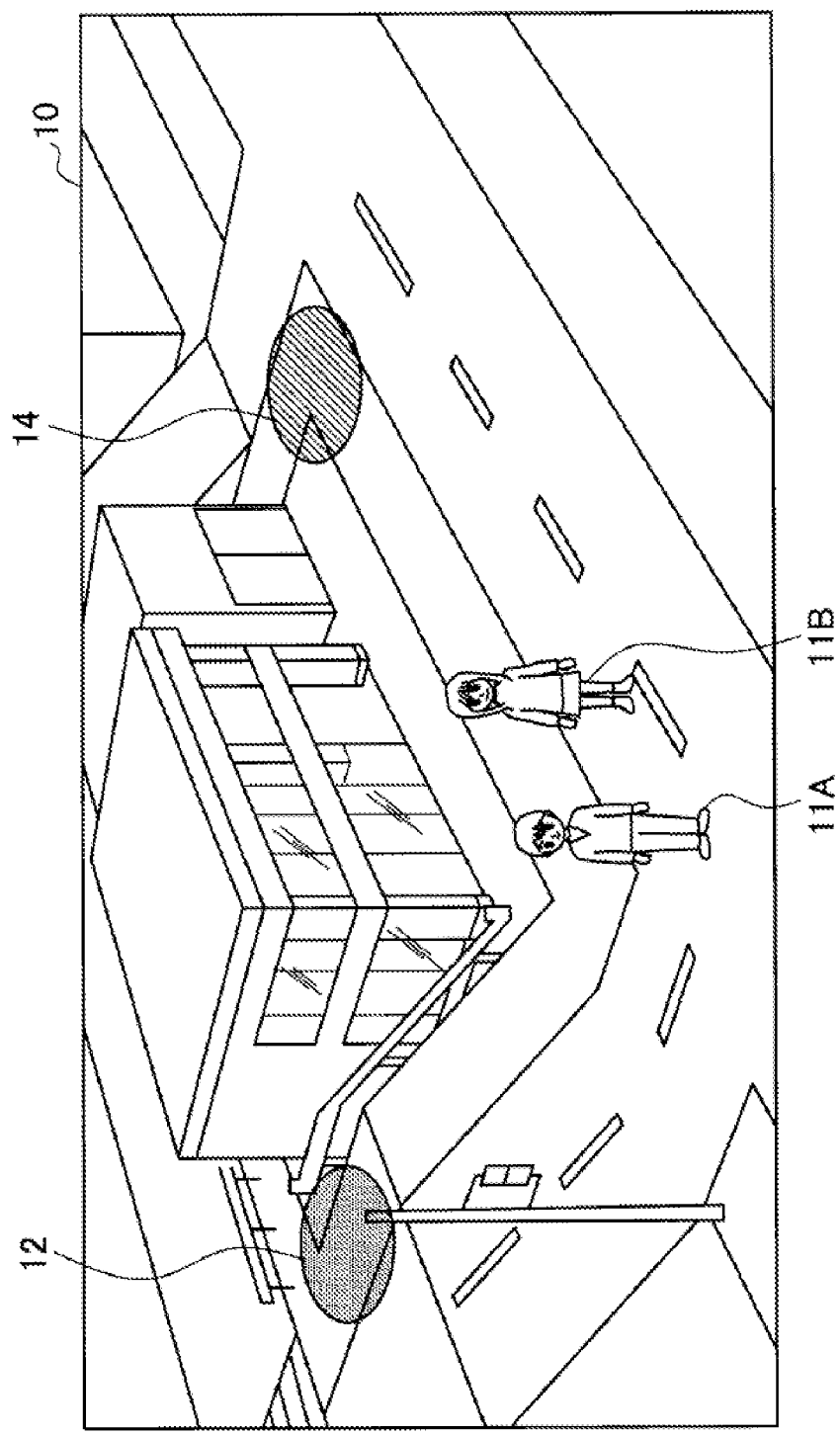
FIG. 8 is a diagram illustrating an example of a virtual space displayed by the terminal device according to the embodiment.
Figure 9:
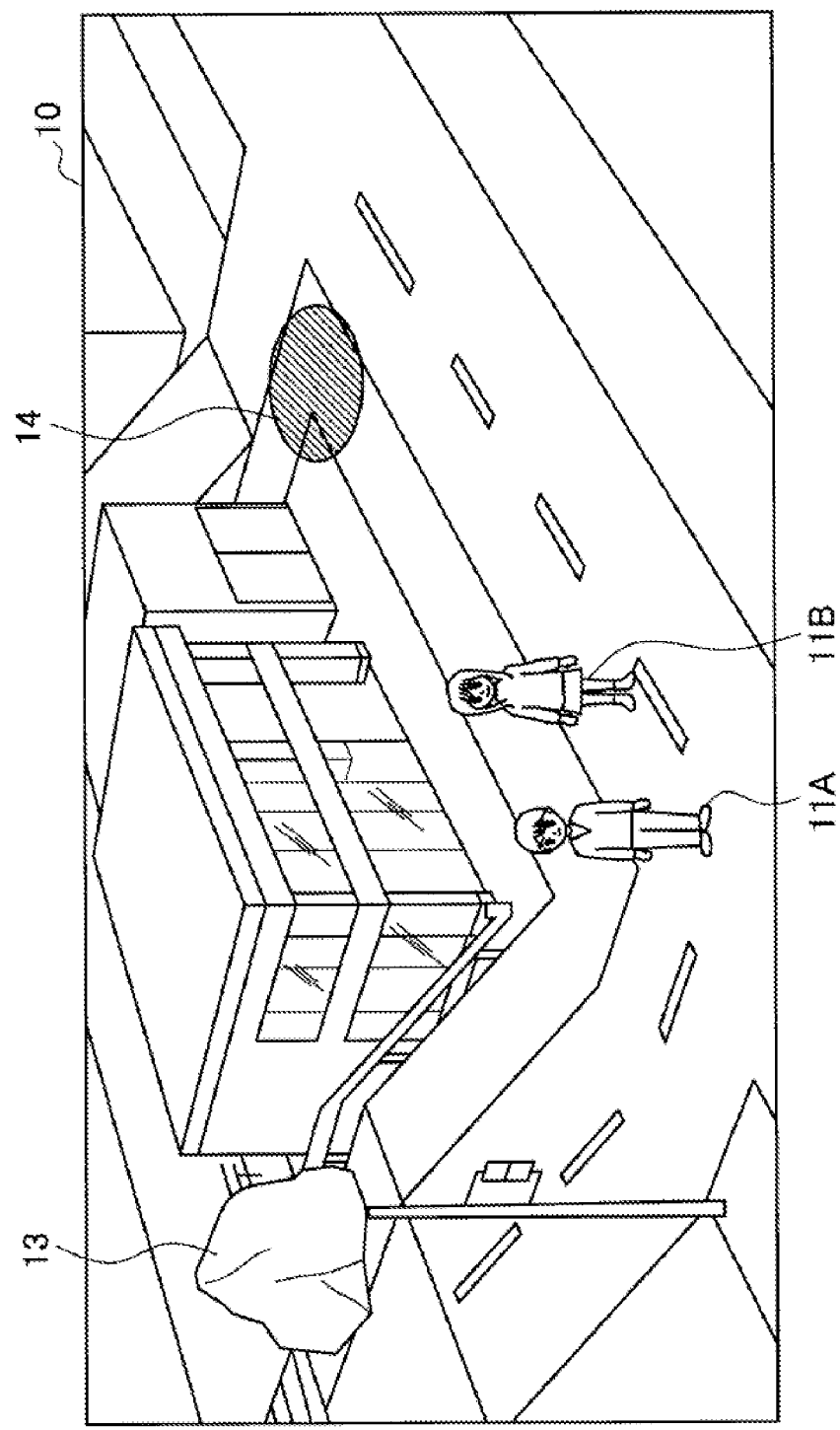
FIG. 9 is a diagram illustrating an example of a virtual space displayed by the terminal device according to the embodiment.

The regulatory information may include information indicating locations where inhalation using the inhalation device 100 is not allowed. Locations where inhalation using the inhalation device 100 is not allowed are also referred to as prohibited inhalation locations hereinafter. Examples of prohibited inhalation locations include restaurants, hospitals, and schools. Examples of information indicating prohibited inhalation locations include information indicating latitude and longitude, information indicating altitude, and information indicating a relative location from a building or the like. In addition, the regulatory information may also include information indicating the conditions under which inhalation is not allowed at a prohibited inhalation location, such as a time period during which inhalation is not allowed at a prohibited inhalation location. Information indicating a prohibited inhalation location is placed in the virtual space as one of the virtual objects. One example of the information indicating a prohibited inhalation location is illustrated in FIG. 8. In the example illustrated in FIG. 8, a virtual object 12 indicating a prohibited inhalation location is placed in the virtual space 10. The virtual object 12 indicating a prohibited inhalation location is placed at a location in the virtual space that corresponds to the prohibited inhalation location in the real space. Consequently, by referring to the virtual object 12 indicating the prohibited inhalation location, the user is able to easily recognize the prohibited inhalation location in the real space without having to perform a web search or the like.

In the virtual space, a virtual object indicating that inhalation is prohibited may also be placed at location in the virtual space that corresponds to a prohibited inhalation location. For example, instead of the virtual object 12 indicating a prohibited inhalation location illustrated in FIG. 8, a virtual object 13 of a boulder illustrated in FIG. 9 may be placed. Furthermore, the management device 300 may also impose a demerit on an avatar, such as preventing the avatar from passing through the virtual object 13 of a boulder, or causing the avatar to take damage if the avatar touches the virtual object 13 of a boulder. With this configuration, the user's movement to a prohibited inhalation location is hindered, thereby making it possible to hinder inhalation using the inhalation device 100 at the prohibited inhalation location naturally.

The regulatory information may include information indicating locations where inhalation using the inhalation device 100 is allowed. Locations where inhalation using the inhalation device 100 is allowed are also referred to as allowed inhalation locations hereinafter. Examples of allowed inhalation locations include smoking areas, tobacco stores, and retail shops that sell the inhalation device 100 or the base material. Examples of information indicating allowed inhalation locations include information indicating latitude and longitude, information indicating altitude, and information indicating a relative location from a building or the like. The regulatory information may also include information indicating the conditions under which inhalation is allowed at an allowed inhalation location, such as a time period during which inhalation is allowed at an allowed inhalation location. Information indicating an allowed inhalation location is placed in the virtual space as one of the virtual objects. One example of the information indicating an allowed inhalation location is illustrated in FIG. 8. In the example illustrated in FIG. 8, a virtual object 14 indicating an allowed inhalation location is placed in the virtual space 10. The virtual object 14 indicating an allowed inhalation location is placed at a location in the virtual space 10 that corresponds to the allowed inhalation location in the real space. Consequently, by referring to the virtual object 14 indicating the allowed inhalation location, the user is able to easily recognize the allowed inhalation location in the real space without having to perform a web search or the like.

The virtual space does not have to correspond to the real space exactly, and may also be a space in which the space corresponding to the real world is updated according to the regulatory information. For example, first, the management device 300 generates an initial virtual space corresponding to a real space by placing virtual objects corresponding to real objects, such as the ground surface, roads, and buildings in the real space. Thereafter, the management device 300 makes topographical changes that cause topographical features to appear, such that the topographical features act as obstacles at locations in the virtual space that correspond to prohibited inhalation locations. Examples of topographical features that act as obstacles include cliffs, mountains, rivers, and swamps. Through such topographical changes, a natural hindrance to inhalation using the inhalation device 100 at prohibited inhalation locations is achieved, similarly to the case of placing a virtual object indicating a prohibited inhalation location described above. On the other hand, with regard to allowed inhalation locations, the management device 300 may make topographical changes that cause topographical features to appear, such that the topographical features confer merits such as a paved road to avatars at locations in the virtual space that correspond to allowed inhalation locations, for example. In this way, by updating the topography of the virtual space 10 according to the regulatory information, it is possible to make the user perceive the regulatory information naturally as a part of the game experience.

(3) Communication Between Users

Each user is able to control an avatar and thereby cause the avatar to behave in a desired way in the virtual space. Communication between avatars is also an example of such behavior. Through communication between avatars, communication between users may be achieved.

The terminal device 200 transmits information inputted by a user for controlling an avatar to the management device 300. Examples of input for controlling an avatar include single taps, double taps, swipes, and slides, as well as text/voice input of conversational content. The management device 300 generates a virtual space on the basis of the information received from the terminal device 200. For example, in the virtual space, an avatar corresponding to a user and an avatar corresponding to another user communicate in correspondence with information inputted by the users for controlling the respective avatars. Additionally, the terminal device 200 outputs the virtual space generated by the management device 300.

Examples of communication between avatars include conversation, the gifting of points usable by users inside the virtual space, and combat. Other examples of communication between avatars include asking another user for a supply of electric power to the inhalation device 100 and giving points in exchange as compensation. Note that conditions may also be imposed on how communication is performed, such as enabling communication only between users who are inhaling at the same allowed inhalation location.

(4) Process According to Relationship Between Regulatory Information and Inhalation Information The management device 300 (for example, the virtual space management unit 333) may also perform a process according to the relationship between the regulatory information and the inhalation information.

As an example, in the virtual space, actions that are executable by an avatar corresponding to a user may be set according to the relationship between the inhalation location and the regulatory information. For example, in the case where the inhalation location is a prohibited inhalation location, the actions that are executable by the avatar corresponding to the user are limited compared to the case where the inhalation location is an allowed inhalation location. For example, in the case where the inhalation location is an allowed inhalation location, free conversation with other users is enabled. On the other hand, in the case where the inhalation location is a prohibited inhalation location, conversation with other users is disabled.

As another example, in the virtual space, the avatar corresponding to the user may be displayed with an appearance according to the relationship between the inhalation location and the regulatory information. More specifically, in the case where the inhalation location is a prohibited inhalation location, the appearance of the avatar may be degraded compared to the case where the inhalation location is an allowed inhalation location. For example, in the case where the inhalation location is an allowed inhalation location, the avatar is displayed with an appearance that may give a good impression to other users, such as the avatar wearing formal clothes or showing a positive expression. On the other hand, in the case where the inhalation location is a prohibited inhalation location, the avatar is displayed with an appearance that may give a bad impression to other users, such as the avatar wearing informal clothes or showing a negative expression.

Additionally, the management device 300 may grant a benefit or the like to the user on the basis of the regulatory information and the inhalation location. Furthermore, the virtual space may also include information notifying the user that a benefit or the like is granted.

Figure 11:
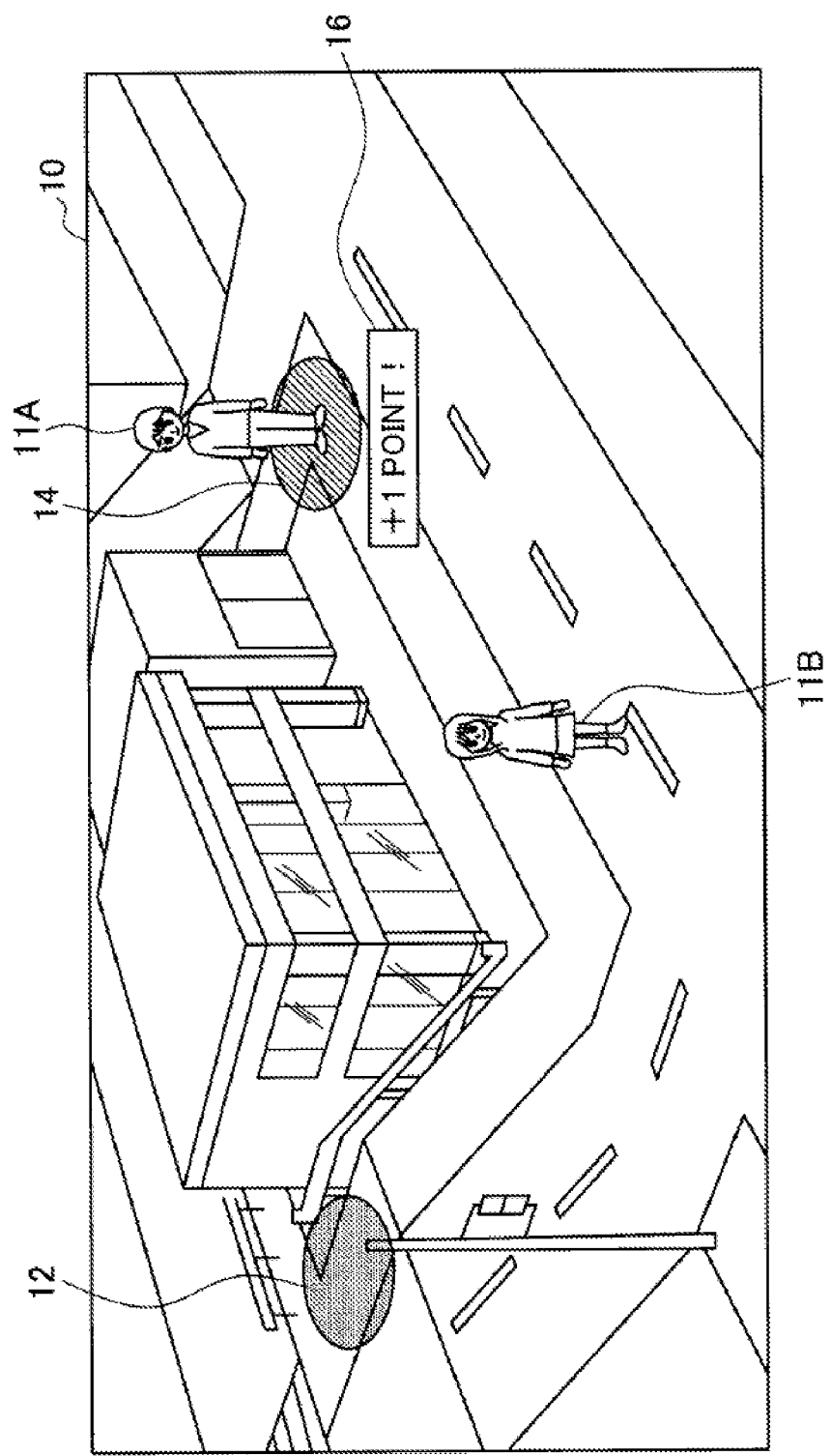
FIG. 11 is a diagram illustrating an example of a virtual space displayed by the terminal device according to the embodiment.

As an example, in the case where the inhalation location is an allowed inhalation location, the management device 300 may grant a benefit to the user, and the virtual space may include information indicating that the benefit is granted to the user. Examples of benefits granted to a user include giving points usable by the user inside the virtual space, and giving the user characters or accessories usable inside the virtual space. If the user inhales using the inhalation device 100 at an allowed inhalation location, the avatar is placed at the location of the virtual object 14 indicating the allowed inhalation location, and information 16 indicating that a point has been added to the user is placed, as illustrated in FIG. 11 for example.

Figure 10:
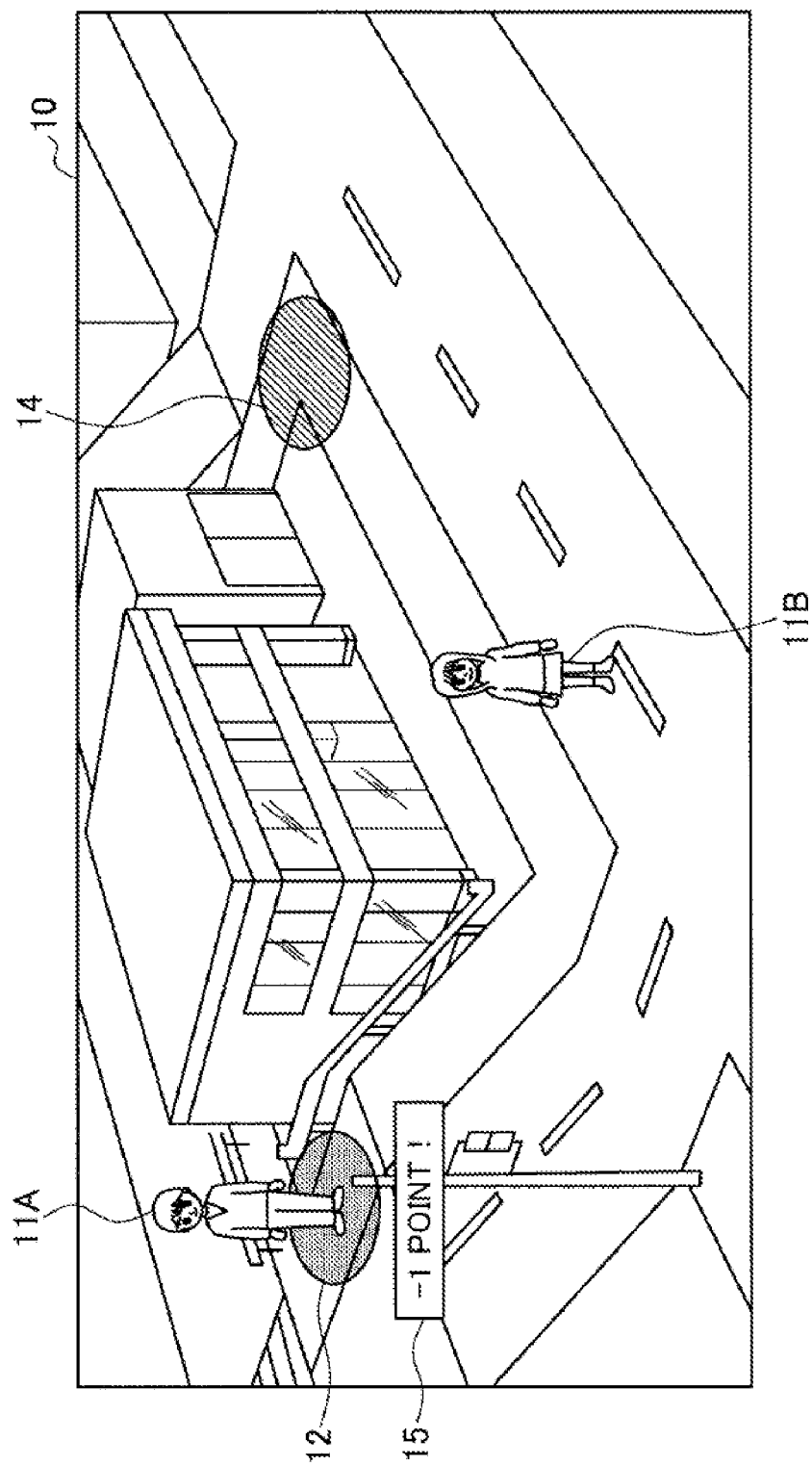
FIG. 10 is a diagram illustrating an example of a virtual space displayed by the terminal device according to the embodiment.

As another example, in the case where the inhalation location is a prohibited inhalation location, the management device 300 may subtract points usable by the user inside the virtual space, and the virtual space may include information notifying the user of the subtraction of points. If the user inhales using the inhalation device 100 at a prohibited inhalation location, the avatar is placed at the location of the virtual object 12 indicating the prohibited inhalation location, and information 15 notifying the user that a point has been subtracted is placed, as illustrated in FIG. 10 for example. Besides the above, the virtual space may also include information warning the user not to inhale using the inhalation device 100 at a prohibited inhalation location.

According to the process described above, it is possible to motivate the user to inhale using the inhalation device 100 at allowed inhalation locations. In addition, it is possible to motivate the user not to inhale using the inhalation device 100 at prohibited inhalation locations.

(5) Flow of Process

Figure 12:
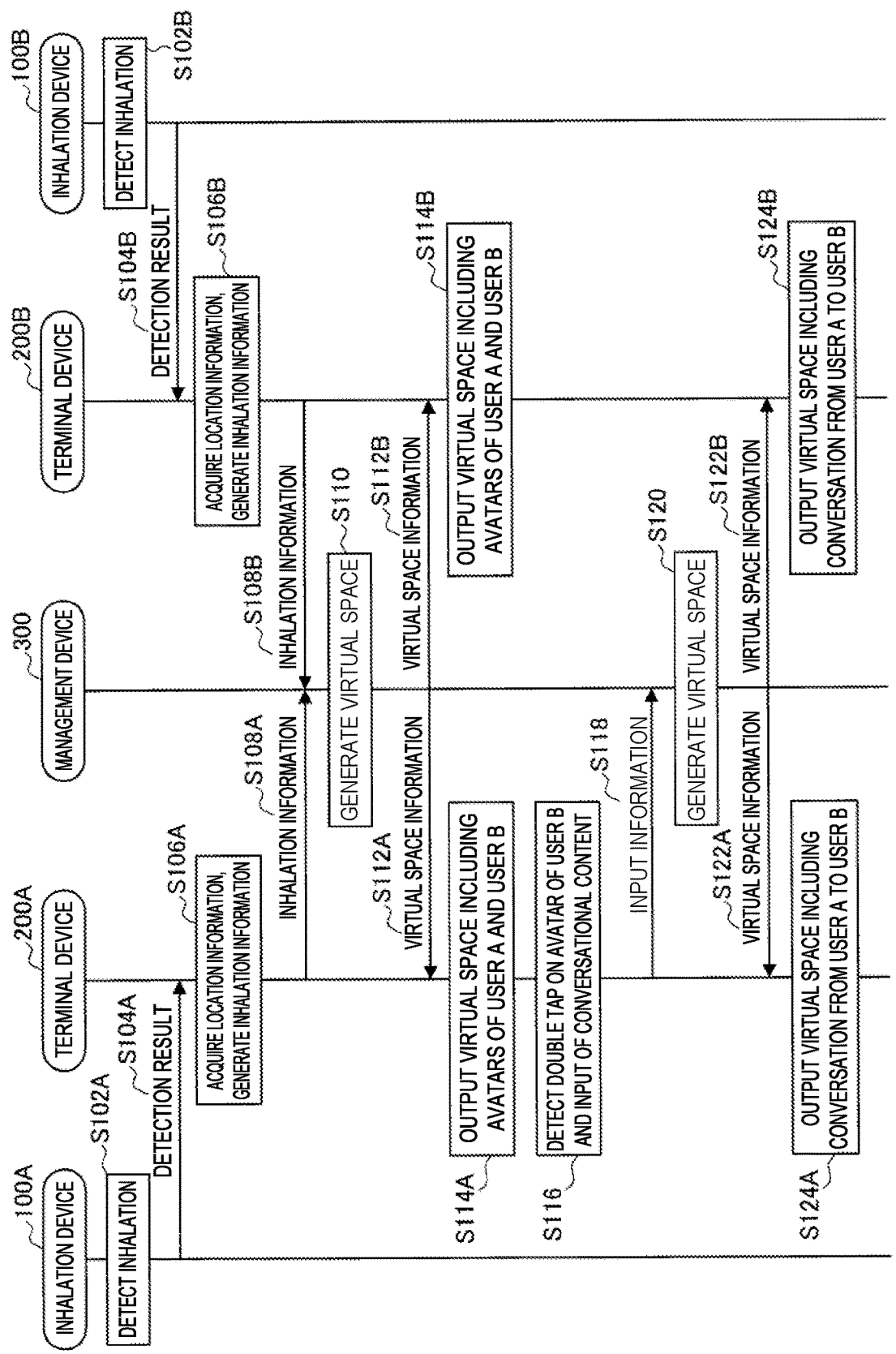
FIG. 12 is a sequence diagram illustrating an example of the flow of a virtual space provision process executed in the system according to the embodiment.

FIG. 12 is a sequence diagram illustrating an example of the flow of a virtual space provision process executed in the system 1 according to the embodiment. This sequence involves the inhalation device 100A, the inhalation device 100B, the terminal device 200A, the terminal device 200B, and the management device 300.

As illustrated in FIG. 12, first, the inhalation device 100A detects an inhalation by the user A using the inhalation device 100A (step S102A), and transmits information indicating the detection result to the terminal device 200A (step S104A). Subsequently, the terminal device 200A acquires location information, and generates inhalation information on the basis of the location information and the information received from the inhalation device 100A (step S106A). For example, the terminal device 200A generates inhalation information including the acquired location information and the information received from the inhalation device 100A. Next, the terminal device 200A transmits the generated inhalation information to the management device 300 (step S108A).

Similarly, the inhalation device 100B detects an inhalation by the user B using the inhalation device 100B (step S102B), and transmits information indicating the detection result to the terminal device 200 (step S104B). Subsequently, the terminal device 200B acquires location information, and generates inhalation information on the basis of the location information and the information received from the inhalation device 100B (step S106B). For example, the terminal device 200B generates inhalation information including the acquired location information and the information received from the inhalation device 100B. Next, the terminal device 200B transmits the generated inhalation information to the management device 300 (step S108B).

Thereafter, the management device 300 generates a virtual space on the basis of the inhalation information received from the terminal device 200A and the terminal device 200B (step S110). For example, the management device 300 places an avatar corresponding to the user A at a location in the virtual space corresponding to the inhalation location of the user A as indicated by the inhalation information received from the terminal device 200A. Similarly, the management device 300 places an avatar corresponding to the user B at a location in the virtual space corresponding to the inhalation location of the user B as indicated by the inhalation information received from the terminal device 200B. Subsequently, the management device 300 transmits virtual space information defining the generated virtual space to each of the terminal device 200A and the terminal device 200B (steps S112A and S112B). Thereafter, the terminal device 200A and the terminal device 200B output a virtual space including avatars of the user A and the user B on the basis of the received virtual space information (steps S114A and S114B).

After that, if the terminal device 200A detects a double tap by the user A on the avatar of the user B displayed on a screen and the input of conversational content (step S116), the terminal device 200A transmits the inputted information to the management device 300 (step S118). Subsequently, the management device 300 generates a virtual space on the basis of the received input information (step S120). For example, the management device 300 generates a virtual space in which the avatar of the user A is talking to the avatar of the user B. Next, the management device 300 transmits virtual space information defining the generated virtual space to each of the terminal device 200A and the terminal device 200B (steps S122A and S122B). Thereafter, the terminal device 200A and the terminal device 200B output a virtual space in which the avatar of the user A is talking to the avatar of the user B on the basis of the received virtual space information (steps S124A and S124B).

«4. Modifications»

(1) First Modification

In the foregoing embodiment, the terminal device 200 is described as transmitting inhalation information including location information to the management device 300 at a timing when the user inhales using the inhalation device 100, but the present invention is not limited to such an example.

As an example, location information about the terminal device 200 and a detection result regarding an inhalation by the user using the inhalation device 100 may also be transmitted to the management device 300 separately. For example, the terminal device 200 may transmit location information to the management device 300 periodically, while also transmitting a detection result to the management device 300 at a timing when an inhalation by the user using the inhalation device 100 is detected. In this case, the management device 300 acquires the most recently received location information as the location information indicating the location where the user is inhaling using the inhalation device 100.

As another example, the inhalation device 100 may also generate and transmit inhalation information to the management device 300. For example, the inhalation device 100 has a function of acquiring location information, and in a case of detecting an inhalation by the user, the inhalation device 100 generates and transmits inhalation information to the management device 300. The inhalation information may also be transmitted to the terminal device 200 once and then forwarded by the terminal device 200 to the management device 300.

(2) Second Modification

The foregoing embodiment describes how, in the virtual space, avatars corresponding to the user and an another user are placed at locations in the virtual space corresponding to the respective inhalation locations of the user and the another user, but the present technology is not limited to such an example. For example, in the virtual space, avatars corresponding to the user and the another user may also be placed at locations in the virtual space corresponding to the respective current locations of the user and the another user. In other words, an avatar may also be displayed at timings when the user is not inhaling using the inhalation device 100, and the display location of the avatar may be a location corresponding to the current location of the user. In this case, the terminal device 200 periodically reports location information to the management device 300, and the management device 300 generates the virtual space on the basis of such location information. With this configuration, the user is able to enjoy the game experience in the virtual space even at timings when he or she is not inhaling using the inhalation device 100.

In addition, a destination of the user may also be set in the virtual space. For example, a destination may be set by having the user perform a predetermined operation in the virtual space displayed on the screen of the terminal device 200. As an example of the predetermined operation, the user selects his or her own avatar by performing a long tap for a predetermined length of time or longer, and then sets the destination by performing a swipe or a slide operation. After the destination is set, navigation information to the destination according to the user's current location may also be output in the virtual space, for example. Additionally, information indicating allowed inhalation locations near the user's current location may be output in the virtual space along the way to the destination. With this configuration, the user is able to easily recognize the nearest allowed inhalation location.

(3) Third Modification

The management device 300 (for example, the virtual space generation unit 333) may also generate a virtual space that includes information indicating a degree of congestion at each allowed inhalation location, on the basis of the inhalation information. Specifically, first, the management device 300 calculates the number of people inhaling using the inhalation device 100 at the allowed inhalation location to be calculated (hereinafter also referred to as the number of inhaling users). For example, the management device 300 calculates the number of inhaling users at the allowed inhalation location to be calculated by totaling the number of users whose inhalation location indicated by the inhalation device is the allowed inhalation location to be calculated. Meanwhile, an upper limit on the number of users who can comfortably inhale using the inhalation device 100 is set for each allowed inhalation location in relation to the size of the room and the available facilities. Thereafter, the management device 300 generates information indicating the degree of congestion at each allowed inhalation location on the basis of the upper limit on the number of users and the numbers of inhaling users at each allowed inhalation location to be calculated.

For example, the management device 300 generates information indicating that an allowed inhalation location is crowded in the case where the number of inhaling users exceeds the upper limit on the number of users, and generates information indicating that the allowed inhalation location is not crowded otherwise. The information indicating the degree of congestion may be expressed as the two classes of crowded/not crowded, but may also be expressed as three or more classes, and may also be a continuous value such as the ratio of the number of inhaling users with respect to the upper limit on the number of users.

Note that a comparison of the upper limit on the number of users and the number of inhaling users may also account for users not participating in the game. For example, with regard to tobacco products, if approximately 20% of the total number of smokers in the country are users who inhale using the inhalation device 100 and also participate in the game, then the number of inhaling users may be multiplied by 5 and treated as the actual number of inhaling users for comparison against the upper limit on the number of users. Note that the number of users in the population, such as the total number of smokers in the country, may be acquired on the basis of the results of a survey carried out by an entity such as a national or municipal government.

(4) Fourth Modification

The management device 300 (for example, the regulatory information management unit 331) may update the regulatory information on the basis of a history of the inhalation information for each user. More specifically, the inhalation information obtained for each user is aggregated to calculate the ratio of inhaling at inhalation locations that are allowed inhalation locations for each user. Thereafter, the management device 300 updates the inhalation information for each user, on the basis of the ratio of inhaling at inhalation locations that are allowed inhalation locations and the inhalation information obtained for that user.

As an example, suppose that from a certain day, a plurality of users having a high ratio of inhaling at inhalation locations that are allowed inhalation locations continually inhale using the inhalation device 100 at a specific location that is not an allowed inhalation location. In this case, the management device 300 acknowledges the specific location as a newly established allowed inhalation location, and adds information indicating the acknowledged allowed inhalation location to the regulatory information.

As another example, suppose that from a certain day, a plurality of users having a high ratio of inhaling at inhalation locations that are allowed inhalation locations stop inhaling using the inhalation device 100 at a specific allowed inhalation location. In this case, the management device 300 acknowledges the discontinuance of the specific allowed inhalation location due to a smoking area being removed, for example, and deletes information indicating the specific allowed inhalation location from the regulatory information.

In this way, according to the present modification, the regulatory information is updated on the basis of inhalation information obtained for users having a high ratio of inhaling at inhalation locations that are allowed inhalation locations. Consequently, it is possible to update the regulatory information appropriately by removing noise due to inhalation information obtained for users having a low ratio of inhaling at inhalation locations that are allowed inhalation locations. Additionally, according to the present modification, it is possible to update the regulatory information from the bottom up, and the costs associated with keeping the regulatory information up to date are reduced.

(5) Fifth Modification

The foregoing embodiment describes an example in which a benefit or the like is granted to the user according to the relationship between the inhalation location and the regulatory information, but the present technology is not limited to such an example. For example, a benefit or the like may also be granted to the user on the basis of other information related to inhalations performed by the user using the inhalation device 100.

For example, a benefit may be granted to the user in the case where the user inhales using the inhalation device 100 at a specific place, or in the case where the user inhales using a new inhalation device 100. Specifically, points usable by the user inside the virtual space may be given, or characters or accessories usable inside the virtual space may be given. Also, the granting of these benefits may be limited to the case where a predetermined condition is satisfied, such as only granting benefits to the first 100 users.

(6) Sixth Modification

A variety of virtual objects other than avatars and regulatory information may also be placed in the virtual space. For example, users may be notified with advertisements and messages in the virtual space. Additionally, the virtual space may also be linked with another application, or operated as a service of another application. For example, points usable in another application may be given to users in the virtual space, and the actions of avatars in the virtual space may also influence the other application.

«5. Supplement»

The above describes preferred embodiments of the present invention in detail and with reference to the attached drawings. However, the present invention is not limited to such examples. It is clear to persons ordinarily skilled in the technical field to which the present invention belongs that various modifications or alterations may occur insofar as they are within the scope of the technical ideas stated in the claims, and it is to be understood that such modifications or alterations obviously belong to the technical scope of the present invention.

Furthermore, the processes described using flowcharts and sequence diagrams in this specification do not necessarily have to be executed in the order illustrated in the diagrams. Some of the processing steps may also be executed in parallel. Moreover, additional processing steps may also be adopted, and a portion of the processing steps may also be skipped.

Note that the series of processes performed by each device described in this specification may be achieved using any of software, hardware, or a combination of software and hardware. A program configuring software is stored in advance in a storage medium (non-transitory medium) provided internally or externally to each device, for example. Each program is then loaded into RAM at runtime by a computer and executed by a processor such as a CPU, for example. The above storage medium may be a magnetic disc, an optical disc, a magneto-optical disc, or flash memory, for example. Furthermore, the above computer program may also be delivered over a network for example, without using a storage medium.

REFERENCE SIGNS LIST 1 system
10 virtual space
11 avatar
100 inhalation device
101 battery
103 sensor unit
105 input unit
107 notification unit
109 wireless communication unit
111 generation unit
113 storage unit
115 control unit
130 main body unit
131 male connector
140 cartridge
141 female connector
142 housing part
150 capsule
151 inhaler part
152 insertion part
171 housing
171A top housing
171B bottom housing
172 cover
172a opening
173 switch
174 lid
175 heating unit
180 base material
200 terminal device
210 wireless communication unit
220 input/output unit
230 location detection unit
240 storage unit
250 control unit
251 reporting unit
253 output control unit
300 management device
310 communication unit
320 storage unit
330 control unit
331 regulatory information management unit
333 virtual space generation unit

The invention claimed is:

1. A terminal device comprising:
a communication unit that transmits inhalation information including information indicating a location where a user inhales using an inhalation device, and receives virtual space information defining a virtual space generated on the basis of the inhalation information; and
a control unit that causes the virtual space defined by the received virtual space information to be output by an output unit,
wherein the virtual space information includes regulatory information related to inhalation using the inhalation device, in which the regulatory information includes information indicating a location where inhalation using the inhalation device is not allowed, and
wherein in a case where a location where the user is inhaling using the inhalation device is a location where inhalation using the inhalation device is not allowed, the virtual space includes information notifying the user that points of the user are subtracted.

2. The terminal device according to claim 1, wherein the regulatory information is different depending on a type of the inhalation device.

3. The terminal device according to claim 1, wherein the regulatory information is different depending on a type of a base material in which contents to be consumed by the inhalation device for generating a gas with added flavor components are accumulated.

4. The terminal device according to claim 1, wherein in the virtual space, a virtual object indicating that inhalation is prohibited is placed at a location in the virtual space that corresponds to the location where inhalation using the inhalation device is not allowed.

5. The terminal device according to claim 1, wherein the regulatory information includes information indicating a location where inhalation using the inhalation device is allowed.

6. The terminal device according to claim 5, wherein in a case where a location where the user is inhaling using the inhalation device is a location where inhalation using the inhalation device is allowed, the virtual space includes information notifying the user that a benefit is granted to the user.

7. The terminal device according to claim 1, wherein the virtual space is a space in which a space corresponding to the real world is updated according to the regulatory information.

8. The terminal device according to claim 1, wherein an avatar corresponding to the user is placed in the virtual space, and an action executable by the avatar corresponding to the user is set according to a relationship between a location indicated by the inhalation information and the regulatory information.

9. The terminal device according to claim 1, wherein an avatar corresponding to the user is placed in the virtual space, and the avatar corresponding to the user is displayed with an appearance according to a relationship between a location indicated by the inhalation information and the regulatory information.

10. The terminal device according to claim 1, wherein in the virtual space, an avatar corresponding to each of the user and an another users another user is placed at a location in the virtual space that corresponds to a location indicated by the inhalation information obtained for each of the user and the another user.

11. The terminal device according to claim 1, wherein in the virtual space, an avatar corresponding to each of the user and an another users another user is placed at a location in the virtual space that corresponds to a current location of each of the user and the another user.

12. The terminal device according to claim 1, wherein the communication unit transmits information inputted by the user, and
an avatar corresponding to each of the user and an another users another user is placed in the virtual space, and the avatar corresponding to the user and the avatar corresponding to the another user communicate in correspondence with the information inputted by the user.

13. The terminal device according to claim 1, wherein the virtual space includes information indicating a degree of congestion at each location where inhalation using the inhalation device is allowed.

14. An information processing method comprising:
transmitting inhalation information including information indicating a location where a user inhales using an inhalation device, and receiving virtual space information defining a virtual space generated on the basis of the inhalation information; and
causing the virtual space defined by the received virtual space information to be output by an output unit,
wherein the virtual space information includes regulatory information related to inhalation using the inhalation device, in which the regulatory information includes information indicating a location where inhalation using the inhalation device is not allowed, and
wherein in a case where a location where the user is inhaling using the inhalation device is a location where inhalation using the inhalation device is not allowed, the virtual space includes information notifying the user that points of the user are subtracted.

15. A program embodied on a non-transitory computer readable medium for causing a computer to execute a process comprising:
transmitting inhalation information including information indicating a location where a user inhales using an inhalation device, and receiving virtual space information defining a virtual space generated on the basis of the inhalation information; and
causing the virtual space defined by the received virtual space information to be output by an output unit,
wherein the virtual space information includes regulatory information related to inhalation using the inhalation device, in which the regulatory information includes information indicating a location where inhalation using the inhalation device is not allowed, and
wherein in a case where a location where the user is inhaling using the inhalation device is a location where inhalation using the inhalation device is not allowed, the virtual space includes information notifying the user that points of the user are subtracted.

* * * * *